(12) United States Patent
Karasawa

(10) Patent No.: US 7,454,317 B2
(45) Date of Patent: Nov. 18, 2008

(54) APPARATUS PRODUCTIVITY IMPROVING SYSTEM AND ITS METHOD

(75) Inventor: Wataru Karasawa, Tokyo (JP)

(73) Assignee: Tokyo Electron Limited (JP)

(*) Notice: Subject to any disclaimer, the term of this patent is extended or adjusted under 35 U.S.C. 154(b) by 0 days.

(21) Appl. No.: 11/593,637

(22) Filed: Nov. 7, 2006

(65) Prior Publication Data

US 2007/0179751 A1 Aug. 2, 2007

Related U.S. Application Data

(62) Division of application No. 10/466,787, filed as application No. PCT/JP02/00427 on Jan. 22, 2002, now Pat. No. 7,133,807.

(30) Foreign Application Priority Data

Jan. 22, 2001 (JP) ............................. 2001-013571

(51) Int. Cl.
*G06F 17/00* (2006.01)
*G06F 17/40* (2006.01)

(52) U.S. Cl. .................. 702/188; 702/182; 702/184; 702/187; 702/185

(58) Field of Classification Search ............. 702/188, 702/185
See application file for complete search history.

(56) References Cited

U.S. PATENT DOCUMENTS

| | | | | |
|---|---|---|---|---|
| 4,399,428 | A * | 8/1983 | Hughes et al. | 340/500 |
| 4,890,095 | A * | 12/1989 | Esser et al. | 340/657 |
| 5,835,886 | A * | 11/1998 | Scheil | 702/179 |
| 6,303,395 | B1 * | 10/2001 | Nulman | 438/14 |
| 2003/0212929 | A1 * | 11/2003 | Sekizawa | 714/47 |

FOREIGN PATENT DOCUMENTS

| | | |
|---|---|---|
| EP | 0895399 A1 * | 2/1999 |
| JP | 01-276301 | 11/1989 |
| JP | 08-069593 | 3/1996 |
| JP | 409152909 A * | 6/1997 |
| JP | 11-015520 | 1/1999 |
| JP | 11-065874 | 3/1999 |
| JP | 11-074170 | 3/1999 |
| JP | 11-134018 | 5/1999 |
| JP | 11-161327 | 6/1999 |
| JP | 11-327626 | 11/1999 |
| JP | 2000-148331 | 5/2000 |
| JP | 2000-207019 | 7/2000 |
| JP | 2000-263381 | 9/2000 |
| JP | 2000-348226 | 12/2000 |
| JP | 2001-007935 | 1/2001 |

OTHER PUBLICATIONS

Nomura et al., Translation of JP 11-327626, Nov. 26, 1999.*

(Continued)

*Primary Examiner*—Hal D Wachsman
(74) *Attorney, Agent, or Firm*—Finnegan, Henderson, Farrabow, Garrett & Dunner, L.L.P.

(57) ABSTRACT

There is provided a system and method for monitoring an apparatus from a remote location. A vendor-side computer obtains operating state data obtained by a monitoring device provided in an apparatus via a communication line, and monitors the operating state of the apparatus from a remote location. Maintenance data at a part replacing time is transmitted from the apparatus, and the vendor-side computer that has received maintenance data calculates an optimal replacement period of a part based on this. The calculated optimal replacement period of each part is sent to a plant. The plant feeds the optimal replacement period back to the operating of the apparatus.

9 Claims, 11 Drawing Sheets

OTHER PUBLICATIONS

Translation of JP409152909A.*

Office Action of Jan. 16, 2007 from counterpart Japanese Patent Application No. 2002-558081.

Office Action of May 22, 2007, from counterpart Japanese Patent Application No. 2002-558081.

Office Action of Oct. 2, 2007, from counterpart Japanese Patent Application No. 2002-558081.

* cited by examiner

| DELIVERY DESTINATION | PLANT | SERIAL NUMBER | DATA FOR EACH PARAMETER | |
|---|---|---|---|---|
| ABC | 101 | PV001 | TEMPERATURE | *1 |
| | | | PRESSURE | ·· |
| | | | GAS FLOW | ·· |
| | | TP001 | ··· | |
| | 110 | TP002 | ··· | |
| DEF | 120 | CV001 | ··· | |
| | | TP003 | ··· | |
| | | CM001 | ··· | |
| | 130 | CM002 | ··· | |
| ··· | ··· | ······ | ··· | |

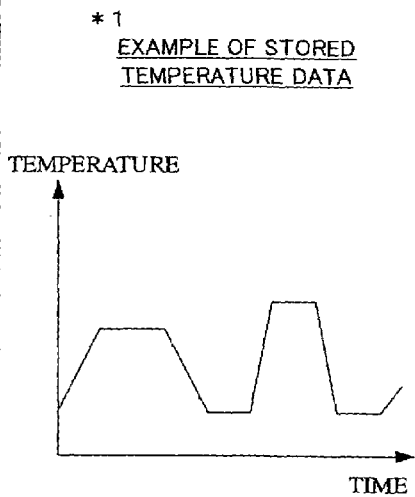

*1
EXAMPLE OF STORED TEMPERATURE DATA

FIG.2

| DELIVERY DESTINATION | PLANT | SERIAL NUMBER | PART | REPLACEMENT HISTORY | USING TIME |
|---|---|---|---|---|---|
| ABC | 101 | PV001 | PP001 | 01/01/01 | TWO WEEKS |
| | | | | 01/01/10 | NINE DAYS |
| | | | VB002 | 01/01/01 | ONE MONTH |
| | | | ·· | ···· | ··· |
| | | TP001 | | ············ | |
| | 110 | TP002 | | ············ | |
| DEF | 120 | CV001 | | ············ | |
| | | TP003 | | ············ | |
| | | CM001 | | ············ | |
| | 130 | CM002 | | ············ | |
| ··· | ··· | ······ | | ············ | |

FIG.3

| PROCESS | PARAMETER | PROFILE |
|---|---|---|
| A | PRESSURE | * 2 |
|   | TEMPERATURE | * 3 |
|   | . . . | . . . |
| B | . . . | . . . |
|   | . . . | . . . |
| . . . | . . . | . . . |
* 2 EXAMPLE OF PRESSURE PROFILE
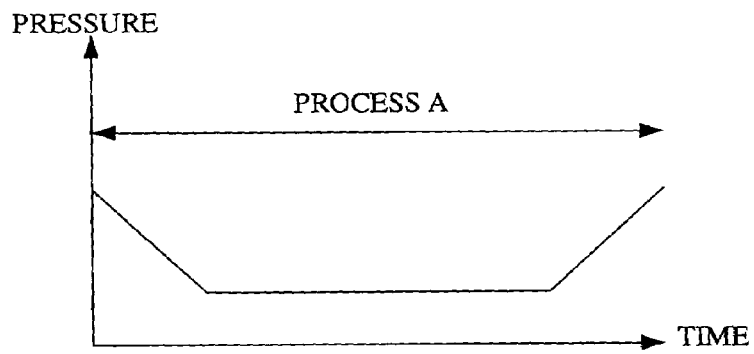
* 3 EXAMPLE OF TEMPERATURE PROFILE
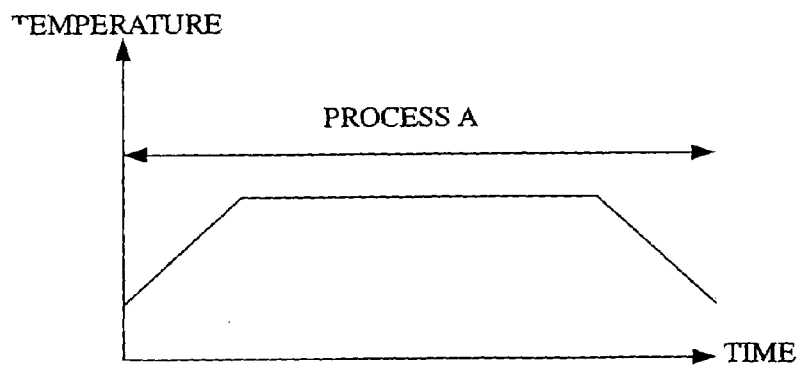
FIG.4

| DELIVERY DESTINATION | PLANT | SERIAL NUMBER | PROCESS CHART |
|---|---|---|---|
| A B C | 1 0 1 | P V 0 0 1 | *4 |
| | | T P 0 0 1 | ... |
| | 1 1 0 | T P 0 0 2 | ... |
| ... | ... | ..... | ... |

*4
EXAMPLE OF PROCESS CHART

| PART | SUPPLIER | MAIL ADDRESS | CELLULAR PHONE NUMBER |
|---|---|---|---|
| PP001 | A | 1234@pipe.co.jp | ×××-××××-×××× |
| VB002 | B | 2345@valve.co.jp | ×××-××××-×××× |
| MF003 | C | 3456@mfc.com | ×××-××××-×××× |
| . . . . . | . . | . . . . . . . . . | . . . . . . . . . |

FIG.6

| SERIAL NUMBER | DELIVERY DESTINATION | MAIL ADDRESS OF PERSON IN CHARGE AT DELIVERY DESTINATION | MAIL ADDRESS OF PERSON IN CHARGE AT OWN COMPANY |
|---|---|---|---|
| PV001 | ABC | XXX@abc.com | X001@xyz.com |
| | | | X002@xyz.com |
| CV001 | DEF | XXX@def.com | X003@xyz.com |
| | | | X004@xyz.com |
| . . . . . | . . . | . . . . . . . . . . . | . . . . . . . . . . . |

FIG.7

| TYPE OF APPARATUS | PART | OPTIMAL REPLACEMENT PERIOD |
|---|---|---|
| A SERIES OF PV | PP001 | TWO WEEKS |
| | VB002 | ONE MONTH |
| | . . . . . | . . . |
| . . . . . | . . . . . . | . . . |

FIG.8

| DELIVERY DESTIN-ATION | PLANT | SERIAL NUMBER | NUMBER OF RUN TIMES | FILM THICKNESS | UNIFORMITY | · · · |
|---|---|---|---|---|---|---|
| A B C | 1 0 1 | PV001 | · · · | · · · | · · · | · · · |
| | | | · · · | · · · | · · · | · · · |
| | | TP001 | · · · | · · · | · · · | · · · |
| | | | · · · | · · · | · · · | · · · |
| | 1 1 0 | TP002 | · · · | · · · | · · · | · · · |
| | | | · · · | · · · | · · · | · · · |
| D E F | 1 2 0 | CV001 | · · · | · · · | · · · | · · · |
| | | | · · · | · · · | · · · | · · · |
| · · · | · · · | · · · · · · | · · · | · · · | · · · | · · · |

FIG.14

| TYPE OF APPARATUS | PART | OPTIMAL REPLACEMENT PERIOD | CLEANING PERIOD |
|---|---|---|---|
| CVD DEVICE | WAFER BOARD | RAN 00 TIMES | RAN XX TIMES |
| | HEATER | RAN △△ TIMES | · · · |
| | · · · · · · | · · · | · · · |
| · · · · · · | · · · · · · | · · · | · · · |

FIG.15

APPARATUS PRODUCTIVITY IMPROVING SYSTEM AND ITS METHOD

This is a division of application Ser. No. 10/466,787, now U.S. Pat. No. 7,133,807, filed Jul. 21, 2003, which is a National Phase Application based on PCT/JP02/00427, filed Jan. 22, 2002, the content of which is incorporated herein by reference, and claims the priority of Japanese Patent Application No. 2001-013571, filed Jan. 22, 2001.

TECHNICAL FIELD

The present invention relates to an apparatus productivity improving system and its method, and for example, an apparatus productivity improving system and its method that makes apparatuses for productivity such as electronic devices and the like remote-controllable to improve an operation rate of the apparatus and obtain improvement in productivity.

BACKGROUND ART

In recent years, the life cycles of industrial products, particularly electronic devices, have become extremely short due to more intensification in development competition between manufactures. Under such circumstances, the manufacturers for the electronic device manufacturing apparatus are required to provide manufacturing apparatus that can ensure high productivity for products and maintain it. More specifically, it has been demanded to provide manufacturing apparatuses that can manufacture more products at the same time and can perform the same amount of productions with a smaller number of apparatuses.

In order to ensure and maintain the high productivity, there is need of an effective operation of the apparatus used in manufacturing the products. The operational management of the apparatus for production at the plant is performed using generally the operation rate as an index. Regarding the operation rate of the apparatus, the value under test conditions is generally decided, but is different depending on the client's operational condition. For this reason, the operation rate of the apparatus is decided between a vendor that provides apparatuses and the manufacturer that is a user. For example, when an operational reference is set to the operation rate of 90% with respect to a certain apparatus, the manufacturer that uses the apparatus and the vendor that supports the apparatus perform the maintenance management of the apparatus such that the operating state of the apparatus satisfies the above value.

The maintenance management can be largely divided into corrective maintenance, breakdown maintenance, and preventive maintenance. In general, corrective maintenance is mainly performed to operate the apparatus stably at the initial time of using the apparatus. Then, after the apparatus satisfies a predetermined operation rate and the apparatus reaches a stable operating state, the breakdown maintenance and preventive maintenance become important to keep the operating state. The breakdown maintenance indicates posterior maintenance management that is provided after trouble occurs in the apparatus. The preventive maintenance is preventive maintenance management that identifies the location where occurrence of trouble is predicted to provide maintenance management to the location intensively.

Furthermore, the operation rate can be expressed by [(operational time)−(stop time)]/(operational time)×100 (%). Operational time is time for which the apparatus should be in an operational status. Accordingly, a value obtained by subtracting stop time from the operational time, indicates effective (real) operation time of the apparatus. As is obvious from this equation, in order to obtain high operation rate to ensure high throughput, it is necessary to shorten operation stop time of apparatus.

As a method for shortening stop time, there is known a method in which maintenance management system that performs maintenance management (breakdown maintenance) of the apparatus is automated to shorten sudden stop time such as trouble occurrence time and the like. For example, information exchange on the apparatus operational status and trouble status between the vendor and the manufacturer is made online to be automated; thereby this can be carried out. Unexamined Japanese Patent Application KOKAI Publication No. H11-15520 discloses a remote-monitoring (remote-maintaining) system, which makes such breakdown maintenance efficient, between the single vendor and the manufacturer.

The above-disclosed remote-marinating system is composed of apparatuses provided at a plurality of plants, a host computer for monitoring provided at each plant, and a host computer for management, which is connected to the host computer of each plant via a communication line and which is provided at a vendor's office that supplies the apparatuses. The host computer at the plant (manufacturer) side always monitors the apparatus. While, the host computer at the vendor side monitors whether there is a report on trouble occurrence and obtains it if there is a report on trouble occurrence. Then, the host computer at the vendor side analyzes the report on trouble occurrence and transmits information indicating treatment to the plant side.

However, in the above-disclosed remote-maintenance system is structured such that the host computer for monitoring is directly connected to the apparatus to perform transmission, and it is preferable that monitoring and transmission are separately performed. Moreover, since the production is uniquely placed in the apparatus, there is a possibility that the method for transmitting a large amount of data including other data excepting one for remote-maintenance to the vendor via the host computer will decrease the throughput of the apparatus, and this is not realistic.

By the way, regarding the way of thinking about the maintenance management, the preventive maintenance "fix before breakdown" is becoming the mainstream instead of the breakdown maintenance "fix after breakdown". The preventive maintenance can prevent trouble occurrence and reduce the sudden stop of the apparatus by sufficient preventive maintenance. However, even in when the preventive maintenance is performed, it is necessary to stop the apparatus, and the frequent or inefficient preventive maintenance reduces the substantial operation rate of the apparatus and suppresses productivity. In addition, the preventive maintenance can execute not the sudden maintenance but a planed maintenance to make it possible to carry out a planned production. For this reason, as a system for ensuring the high operation rate of apparatus, there has been a system that is capable of carrying out efficient maintenance management including the preventive maintenance.

DISCLOSURE OF THE INVENTION

In consideration of the aforementioned circumstances, an object of the present invention is to provide a system and method for improving productivity of the apparatus.

Moreover, another object of the present invention is to provide a system and method that is capable of performing efficient maintenance management of the apparatus.

In order to attain the above object, a system according to a first aspect of the present invention is a system, which is a system that monitors an apparatus from a remote location to improve its productivity, comprising receiving means, which is connected to the apparatus via communication, for receiving operation information indicating an operating state of the apparatus, and monitoring means for monitoring the apparatus based on operation information received by the receiving means.

According to the above structure, the monitoring means performs monitoring from the remote location via the communication based on operation information received by the receiving means. In this way, the apparatus and the monitoring device are directly connected to each other via communication, making it possible to monitor the apparatus at real time and to perform efficient maintenance management.

When the monitoring means detects trouble of the apparatus based on the operation information to specify a trouble part of the apparatus, the monitoring means may perform order processing or order preparation processing for a replacement part of the trouble part. This makes it possible to reduce operation stop time of the apparatus due to out-of-stock parts and to perform efficient maintenance management.

The monitoring means may derive an optimal periodic check time of the apparatus based on operation information of the apparatus, and feed back the derived optimal periodic check time to the apparatus.

The receiving means may further receive maintenance data relating to a part replacement of the apparatus from the apparatus. In this case, the monitoring means monitors the apparatus based on maintenance data received by the receiving means. This makes it possible for the monitoring means to grasp even maintenance data relating to the apparatus substantially at real time.

The maintenance data may be data, relating to replacement date and time, kind, and using time of a part, that is obtained at the time of replacing the part forming the apparatus. Moreover, the monitoring means may derive an optimal replacement period of the part from the maintenance data and fed back to the apparatus. In this way, the optimal replacement period of the derived part is sent to the apparatus side to be fed back to the operation of the apparatus, making it possible to improve the productivity of the apparatus.

The monitoring means may perform order processing or order preparation processing for a replaced part based on the maintenance data. This makes it possible to reduce operation stop time of the apparatus due to out-of-stock parts and to perform efficient maintenance management.

The operation information may include a processing conditional parameter of a predetermined process in which the apparatus provides predetermined processing to a processing object. The processing conditional parameter may include temperature of a chamber of the apparatus, pressure, or gas flow, or combinations of these. According to the above structure, the monitoring means (for example, computer) can recognize the operating state of the apparatus from the change in various parameters. The status of the apparatus is judged from the change in the various parameters, thereby making it possible to perform remote monitoring with high reliability. Moreover, there is a case in which an apparatus user sets the parameter by the method other than the method designated by the apparatus vendor, and such a simple error is eliminated, thereby making it possible to obtain a high operation rate.

The operation information may include image data. In other words, there may be possible a structure in which sensor means is provided in the apparatus, an image pickup device is used as the sensor means to obtain image data relating to the operating state of the apparatus and the apparatus is monitored based on the obtained image data. This makes it possible to monitor the operating state of the apparatus in a many-sided manner.

The operation information may include yield data of the apparatus. The operation information may include the number of processing objects processed by the apparatus. The apparatus may be a manufacturing apparatus for semiconductor devices or liquid crystal display devices.

In order to attain the above object, a system according to a second aspect of the present invention is a system comprising an apparatus including sensor means for obtaining its own operation information and transmitting means for transmitting operation information obtained by the sensor means; a monitoring device including receiving means, which is connected to the apparatus via communications, for receiving operation information transmitted by the transmitting means of the apparatus; and monitoring means for monitoring the apparatus based on operation information received by the receiving means.

According to the above structure, the monitoring means monitors the apparatus from the remote location via the communication based on its own operation information obtained by the sensor means that the apparatus includes itself. In this way, the apparatus and the monitoring device are directly connected to each other via communication, making it possible to monitor the apparatus at real time and to perform efficient maintenance management.

When the monitoring means detects trouble of the apparatus to specify a trouble part of the apparatus, the monitoring means may perform order processing or order preparation processing for a replacement part of the trouble part.

The monitoring means may derive an optimal periodic check time of the apparatus based on operation information of the apparatus, and feed back the derived optimal periodic check time to the apparatus.

The apparatus may further include inputting means that is capable of inputting maintenance data relating to a part replacement of the apparatus. In this case, the transmitting means may transmit maintenance data input by the inputting means to the monitoring means.

The maintenance data may be data, relating to replacement date and time, kind, and using time of a part, that is obtained at the time of replacing the part forming the apparatus. Moreover, the monitoring means may derive an optimal replacement period of the part from the maintenance data and fed back to the apparatus.

The monitoring means may perform order processing or order preparation processing for a replaced part based on the maintenance data. The monitoring means may perform order processing or order preparation processing for a replaced part based on the maintenance data.

The apparatus may perform a predetermined process to provide predetermined processing to a processing object. Moreover, the operation information may include a processing conditional parameter of the process.

The apparatus may include a chamber, and the processing conditional parameter may include temperature of the chamber, pressure, or gas flow, or combinations of these.

The operation information may include image data. The operation information may include yield data of the apparatus. The operation information may include the number of processing objects processed by the apparatus. The apparatus may be a manufacturing apparatus for semiconductor devices or liquid crystal display devices.

In order to attain the above object, a method according to a third aspect of the present invention is a method, which is a method for monitoring an apparatus from a remote location to improve its productivity, comprising the steps of receiving operation information indicating an operating state of the apparatus from the apparatus via communication, and monitoring the apparatus based on operation information received by the receiving step.

In the monitoring step, when trouble of the apparatus is detected based on the operation information to specify a trouble part of the apparatus, order processing or order preparation processing for a replacement part of the trouble part may be performed.

In the monitoring step, an optimal periodic check time of the apparatus may be derived based on operation information of the apparatus, and the derived optimal periodic check time may be fed back to the apparatus.

In the receiving step, maintenance data relating to a part replacement of the apparatus may be further received from the apparatus, and in the monitoring step. In this case, in the monitoring step, the apparatus is monitored based on maintenance data received in the receiving step.

The maintenance data may be data, relating to replacement date and time, kind, and using time of a part, that is obtained at the time of replacing the part forming the apparatus. In this case, in the monitoring step, an optimal replacement period of the part may be derived from the maintenance data and fed back to the apparatus.

In the monitoring step, order processing or order preparation processing for a replaced part may be performed based on the maintenance data.

The operation information may include a processing conditional parameter of a predetermined process in which the apparatus provides predetermined processing to a processing object. Moreover, the processing conditional parameter includes temperature of a chamber of the apparatus, pressure, or gas flow, or combinations of these. The apparatus is a manufacturing apparatus for, for example, semiconductor devices or liquid crystal display devices.

BRIEF DESCRIPTION OF THE DRAWINGS

FIG. 2 illustrates an example of a history information database according to an embodiment of the present invention;

FIG. 3 illustrates an example of a history information database according to the embodiment of the present invention;

FIG. 4 illustrates an example of a profile information database according to the embodiment of the present invention;

FIG. 6 illustrates an example of a contact information database according to the embodiment of the present invention;

FIG. 7 illustrates an example of a contact information database according to the embodiment of the present invention;

FIG. 8 illustrates an example of a replacement period information database according to the embodiment of the present invention;

FIG. 14 illustrates an example of a history information database according to the embodiment of the present invention; and FIG. 15 illustrates an example of a replacement period information database according to the embodiment of the present invention.

BEST MODE OF CARRYING OUT OF THE INVENTION

The following will explain the apparatus productivity improvement system and its method according to the present embodiment. The present embodiment explains, as an example, a case in which a vendor is a manufacturer for a semiconductor manufacturing apparatus and a manufacturer is a semiconductor device manufacturer.

Figure 1:
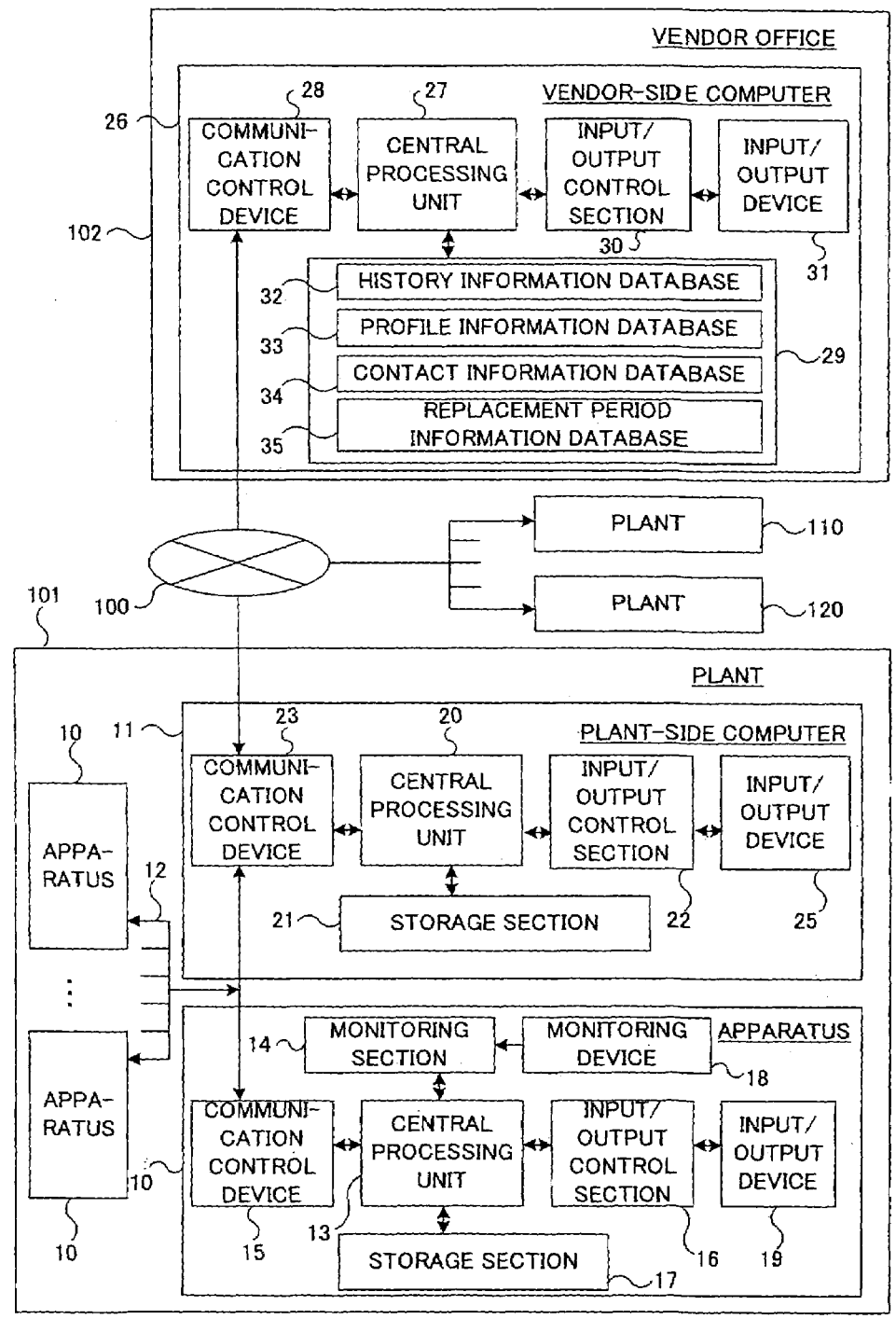
FIG. 1 is a structural view of a system according to an embodiment of the present invention.

FIG. 1 is a structural view of a system according to an embodiment of the present invention.

As illustrated in FIG. 1, the system of the present embodiment is composed of a plant 101 where apparatuses 10 that are supplied by a vendor are used, a vendor's office 102, which is placed at a remote site from the plant 101, and a communication line 100 that connects the plant 101 and the vendor's office 102.

The plant 101 is, for example, a semiconductor manufacturing plant and includes, in its interior, apparatuses 10, a plant-side computer 11, and a plant internal wiring network that connects each apparatus 10 and the plant-side computer 11.

The apparatuses 10 are production apparatuses that are supplied by one or a plurality of vendor supply. The apparatuses 10 are computers (servers) that store various data of, for example, pre-process devices (film forming device, heat processing device, etc.) and post-process devices (mounting unit, test apparatus, etc.) On a semiconductor manufacturing apparatus, and the present embodiment will explain a case of the apparatus having a chamber as an example.

As illustrated in FIG. 1, the apparatus 10 includes a central processing unit 13, a monitoring section 14, a communication control device 15, an input/output control section 16, and a storage section 17.

The central processing unit 13 includes RAM, ROM and the like (not shown), and performs predetermined processing to control the entire operation of the apparatus 10. The monitoring section 14 includes a monitoring device 18 such as a sensor and the like to monitor the operating state of the apparatus 10. Then, the central processing unit 13 sequentially obtains the operating state data of the apparatus 10 from the monitoring section 14 (monitoring device 18).

The communication control device 15 functions as an interface for the apparatus 10 of a plant internal wiring network 12 such as a LAN (Local Area Network). The central processing unit 13 performs transmission and reception to/from an external section via the communication control section 15.

The input/output control section 16 is connected to an input/output device 19 such as a switchboard. The input/output device 19 functions as a human interface. A worker in the plant 101 performs main control of the apparatus 10 from the input/output device 19. Moreover, when desiring to perform a periodical replacement of parts or a repair and replacement, the worker inputs maintenance data such as part replacement date and time, kinds of parts, using time, and the like from the input/output device 19. Maintenance data includes log data that other apparatuses have. Log data is one that is obtained by converting all operation histories of the corresponding apparatus to data together with a time stamp, and shows what operation the plant worker has provided to the apparatus, when and how a certain sensor of the apparatus is operated, when and what routine the software of the apparatus enters, and when and what data is input to the storage section (memory) of the apparatus.

The storage section 17 stores operating state data obtained by the monitoring device 18 and maintenance data input from the input/output device 19. The monitoring device 18 indicates a pressure sensor, a temperature sensor, a flow sensor, and the like that are included in the chamber. Operating state data is data relating to the pressure, temperature, flow and the like that are obtained from these sensors. The central processing unit 13 transmits operation data stored in the storage section 17 to the plant-side computer 11 at real time. Moreover, the central processing unit 13 transmits maintenance data to the plant-side computer 11 every time when a new entry is made. In addition, though the storage section 17 is provided in the apparatus 10 in FIG. 1, for example, the storage section 17 may be provided output of the apparatus 10.

The plant-side computer 11 intensively controls the plurality of apparatuses 10 used in the plant 101. As illustrated in FIG. 1, the plant-side computer 11 includes a central processing unit 20, a storage section 21, an input/output section 22, and a communication control section 23.

The central processing unit 20 includes RAM, ROM and the like (not shown), and performs predetermined processing to control the entire operation of the apparatus 11. The storage section 21 stores operation data and maintenance data such as part replacement date and time and the like, which are received from each apparatus 10 via the plant internal wiring network 12.

The central processing unit 20 always monitors received operating state data, and informs the workers in the plant and the vendor of trouble occurrence when detecting abnormality in the state (operating state) of the apparatus 10. At this time, the central processing unit 20 downloads predetermined software from a vendor-side computer 26 to automatically perform restoration processing when restoration is possible based on response information relating to trouble coping from the vendor, for example, restoration can be carried out by updating software, and the like.

Operating state data that is transmitted to the plant-side computer 11 from the apparatus 10 via the plant internal wiring network 12 is also transmitted to the vendor via the communication line 100. Moreover, maintenance data relating to the part replacement that is periodically transmitted from the apparatus 10 is also transmitted to the vendor. Additionally, operating state data and maintenance data may be obtained by connection to the plant-side computer 11 from the vendor.

The input/output control section 22 is connected to an input/output device 25 having a screen, a keyboard, and the like. The input/output device 25 functions as a human interface. The worker in the plant 101 performs control the plant-side computer 11 and the apparatus 10 connected thereto. Moreover, at the trouble occurring time, the worker is informed from the input/output device 25 that trouble has occurred in the apparatus 25. At this time, there is a case in which the worker performs necessary maintenance work from the input/output device 25.

By the way, the apparatus 10 (semiconductor manufacturing apparatus) is placed in a clean room. However, since the worker must wear a dust-proof uniform, take an air shower, and washes hands to enter the clean room, the input/output device 25 of the apparatus 25 may be placed outside of the clean room. For example, when processing recipe set to the apparatus 10 is changed to deal with the process abnormality occurred in the apparatus 10, the worker can operate the input/output apparatus 25 and change the processing recipe from the outside of the clean room without entering the clean room. However, when trouble occurs in the apparatus 10, it is preferable that trouble occurrence can be understood from the outside of the clean room in order to inform the input/output device 25 that the trouble has occurred.

The communication control device 23 functions as an interface between the plant internal wiring network 12 and the plant-side computer 11 of the communication line 100. The central processing unit 20 performs transmission and reception of data between the apparatus 10 and the vendor via the communication control device 23.

As the communication line 100, for example, a public circuit such as Internet capable of performing high speed communication, ISDN, optical fiber, and the like or a dedicated circuit can be used. Moreover, a public switched network may be used. Regarding the connection, there is a method using a full-time connection or each time connection.

The communication line 100 establishes a connection among the plant 101, a plurality of plants 110, 120 using the apparatuses 10 supplied from the vendor, and the vendor's office 102. The plurality of plants 110 and 120 are structured in the same manner as the plant 101 (not shown). For example, in each of the plants 110 and 120, the plant-side computer that intensively controls the apparatuses 10 is provided. Maintenance management information of the apparatuses 10 of the respective plants 110 and 120 is sent to the vendor via the plant-side computers.

In the vendor's office 102, a vendor-side computer 26 is provided. As illustrated in FIG. 1, the vendor-side computer 26 is composed of a central processing unit 27, a communication control apparatus 28, a storage section 29, and an input/output control section 30.

The central processing unit 27 includes RAM, ROM and the like (not shown), and performs predetermined processing to control the operation of the vendor-side computer 26. The communication control device 28 functions as an interface for the vendor-side computer 26 of the communication line 100. The central processing unit 27 performs data transmission and reception to/from the plurality of plant-side computers 11 via the communication control section 28.

The input/output control section 30 is connected to an input/output device 31 having a screen, a keyboard, and the like. The input/output device 31 functions as a human interface. An operator at the vendor side controls the vendor-side computer 26 from the input/output device 31. Moreover, the operator at the vendor side can transmit coping information to the plant 101 by e-mail at a trouble occurring time or check the operating state of each apparatus 10.

The storage section 29 includes a history information database (DB) 32, a profile information database 33, a contact information database 34, and a replacement period information database 35.

The history information database 32 stores operating state data and maintenance data received from the plant-side computer 11. Information stored in the history information database 32 indicates operating state data and maintenance data within a predetermined period that are obtained from the respective apparatuses 10 operating in the plurality of plants 101, 110, and 120.

FIG. 2 illustrates an example of operating status data stored in the history information database 32. As illustrated in FIG.

2, in the history information database 32, operating state data is collected for each delivery destination (manufacturer) of the apparatus 10, each plant to be used, and each individual (serial number). Operating state data is physical data representing the operating state of the apparatus 10, for example, a physical quantity based on parameters of temperature, pressure, gas flow in the chamber in a predetermined processing step provided to a processing object by the apparatus 10. Operating state data is obtained by the monitoring device 18 of the apparatus 10, and is periodically transmitted to the vendor-side computer 26. In the history information database 32, for example, data as shown by *1 in FIG. 2 is stored as temperature data.

FIG. 3 illustrates an example of maintenance data stored in the history information database. As illustrated in FIG. 3, in the history information database, maintenance data is stored for each delivery destination, plant, individual (serial number), similar to operating state data. Maintenance data is transmitted from the apparatus 10 every time when a part replacement for the apparatus 10 is performed.

The vendor-side computer 26 stores received maintenance data as replacement history (date and time) and using time data for each part that forms the apparatus 10. An optimal replacement period for each part is derived from using time data stored in the history information database 32 as described later.

In the profile information database 33, reference profiles of parameters (temperature, pressure, etc.) On each operation process of the apparatus 10 are stored. For example, when the apparatus 10 performs a predetermined process, a temperature change in the process is fixed. In the profile information database 33, reference profiles relating to various parameters in the respective processes are stored.

FIG. 4 illustrates an example of a standard profile of each parameter relating to processes A and B of the apparatus 10 in the profile information data base 33. As illustrated in FIG. 4, pressure and temperature are used as a change parameter in step A. Then, standard profiles as shown by *2 (pressure) and *3 (temperature) are stored as profiles of the respective parameters.

Figure 5:
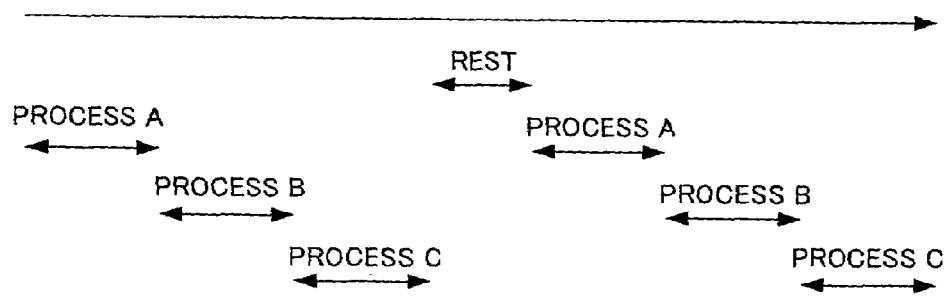
FIG. 5 illustrates an example of a profile information database according to the embodiment of the present invention.

Moreover, as illustrated in FIG. 5, in the profile information database 33, a process chart for each apparatus 10 is stored. The process chart shows an operation schedule for each delivery destination (manufacturer), each plant, and each apparatus 10, and is sent to the vendor side from the manufacturer in advance. As the process chart, one as shown by *4 in FIG. 5 can be named. In this example, the apparatus 10 performs processes A, B, and C continuously, and takes a rest, and performs processes A, B, and C again.

During operation of the apparatus 10, the vendor-side computer 26 reads each parameter of the standard profiles illustrated in FIG. 4 according to the process chart illustrated in FIG. 5, and compares the change profile of each parameter in actual operating state data received from the apparatus 10 with the read standard profile to monitor the status of the apparatus 10. When an error between the actual change profile of each parameter and the standard profile is not within, for example, 5%, the vendor-side computer 26 judges that the apparatus 10 is in an abnormal status.

In the contact information database 34, a supplier that supplies parts, the contact (mail address, cellular phone number) is stored for each structural part of the apparatus 10. FIG. 6 illustrates one example of the contact information database 34 of part supplier. When receiving maintenance data (part replacement information) from the apparatus 10, the vendor-side computer 26 performs order processing or order preparation processing. Namely, the vendor-side computer 26 sends order information of the relevant part to the supplier that supplies the part with reference to the contact information database 34 illustrated in FIG. 6.

Moreover, when detecting abnormity of the apparatus 10 during the monitoring operation and judging that replacement for a specific part is needed, the vendor-side computer 26 sends order information of the relevant part to the supplier with reference to the contact information database 34 (order processing or order preparation processing).

Further, in the contact information database 34, contact (mail address) of the plant-side worker and vendor-side worker (field engineer) is stored. FIG. 7 illustrates an example of a structured database. In the database illustrated in FIG. 7, regarding each apparatus 10, a delivery destination (manufacturer) and a mail address of a (person) in charge at delivery destination and a mail address of a (person) in charge at vendor side are linked.

The vendor-side computer 26 reports trouble occurrence and the contents to the plant side and the vendor side with reference to the contact information database 34 as in FIG. 7 when detecting abnormality in the operating state. The worker in charge at the plant side checks the status of the apparatus 10 based on the report and takes necessary measures. Furthermore, the worker in charge at the vendor side prepares the replacement parts if necessary based on the report, and goes to the plant 101 where the trouble-occurred apparatus 10 is used to perform recovery operation.

In the replacement period information database 35, optimal replacement period of each part that forms the apparatus 10 is stored. FIG. 8 illustrates an example of the replacement period information database 35. Regarding the part replacement period stored in the replacement period information database 35, a period, which is presented to the user side as a using condition at the time when the vendor delivers the relevant apparatus 10 to the user, is stored as initial data.

The central processing unit 27 calculates an optimal replacement period of each part from a predetermined program with reference to the aforementioned initial information and maintenance data stored in the history information database 32. The central processing unit 27 performs the aforementioned processing every time when obtaining new maintenance data, and a newly calculated optimal replacement period is updated and stored in the replacement period information database 35. The optimal replacement period stored in the replacement period information database 35 is periodically transmitted to the plant as information that is possible to be fed back to the operation of the apparatus 10.

Here, the part replacement period that is originally stored as initial data in the replacement period information database 35 is a value, which the vendor has derived from an endurance test at a designing time and a manufacturing time, and not a value under the actual using condition. Moreover, generally, this value is set to be shorter than one that is actually forecasted in order to avoid trouble, causing a possibility that this will be largely different from the value under the actual using condition. In this case, if preventive maintenance such as part replacement is performed according to the aforementioned replacement period, the apparatus cannot be efficiently operated and the operation rate will be substantially reduced. Furthermore, in actual, even sufficiently continuous usable parts are replaced, resulting in waste of cost.

However, as mentioned above, maintenance data under the actual using condition is stored and optimization processing is provided to the stored maintenance data, so that the replacement period of each part that is updated and stored in the replacement period information database 35 comes close to an actual value gradually as an amount of receiving data is increased. Moreover, data stored at the vendor side can be collected from not only the same user (manufacturer) but also a plurality of user different from each other. Accordingly, an amount of obtainable data is increased, and a value to be derived has high reliability as compared with the case in which each user singly collects data.

Therefore, regarding the optimal replacement period to be transmitted to the user, this information can be fed back to the user as more efficient operation condition for the apparatus. The user side combines received replacement period information with the operation plan of each plant to make the preventive maintenance efficient, so that the apparatuses can be operated at a high operation rate.

Figure 9:
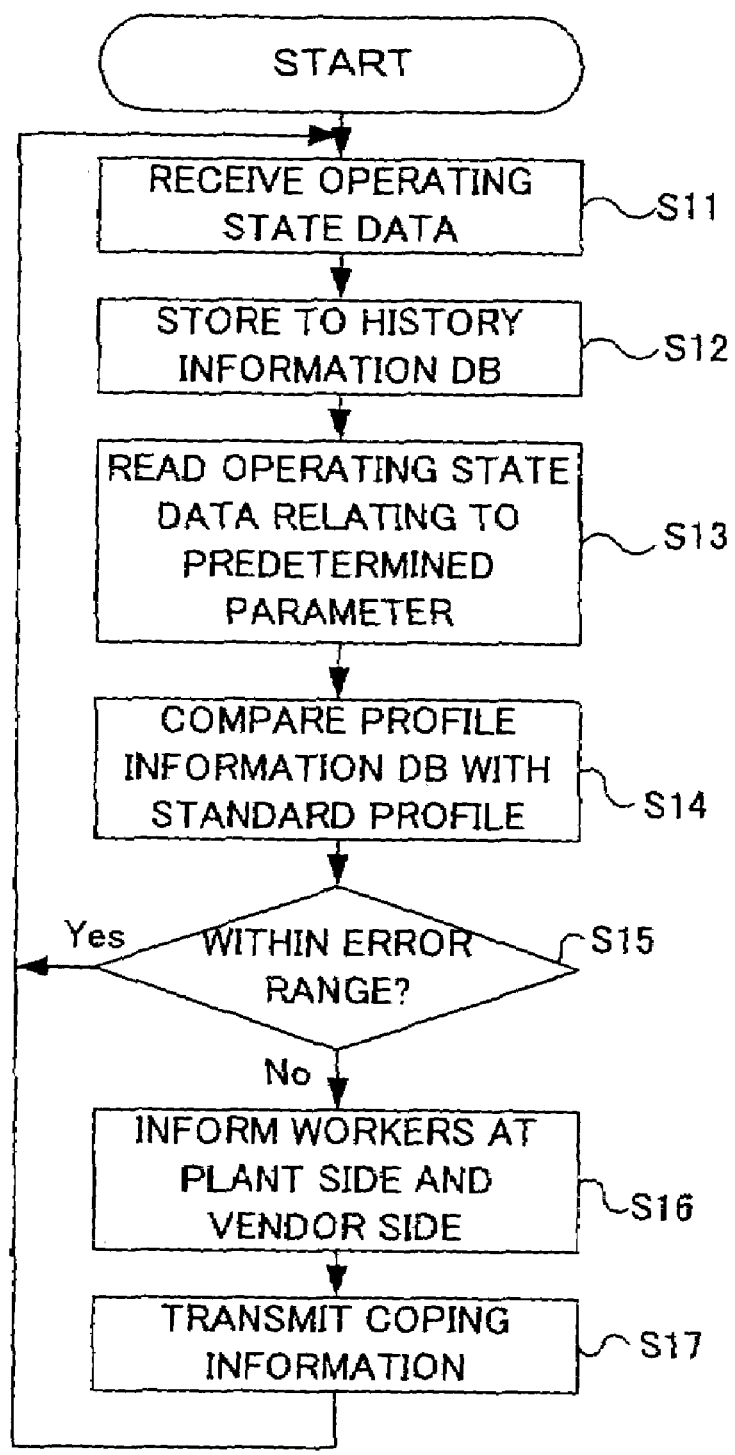
FIG. 9 is a view illustrating an operational flowchart of the system according to the embodiment of the present invention.
Figure 10:
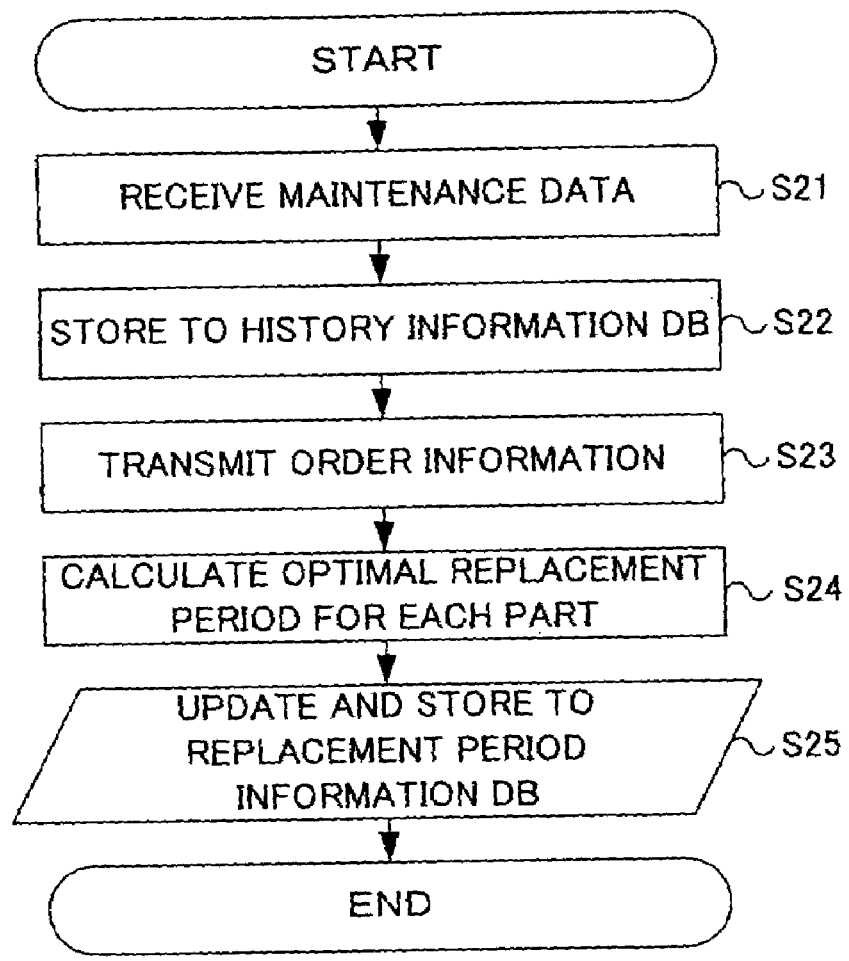
FIG. 10 is a view illustrating an operational flowchart of the system according to the embodiment of the present invention.

The follow will explain the operation of the aforementioned system with reference to the drawings. The operation flowchart of the vendor-side computer 26 will be illustrated in FIGS. 9 and 10. The flowchart illustrated in each of FIGS. 9 and 10 is one example of the operation of the vendor-side computer 26, and any structure may be possible if the same effect is brought about.

During the monitoring operation, the vendor-side computer 26 receives real-time operating state data of the apparatus 10 that the monitoring device 18 obtains (step S11). The vendor-side computer 26 stores received operating state data in the history information database 32 (step S12).

The vendor-side computer 26 reads a predetermined parameter, for example, data based on temperature (change profile) in operating state data received from the history information database 32 (step S13).

Next, the vendor-side computer 26 compares the reference profile relating to the temperature stored in the profile information database 33 with the profile of read (measured) data (step S14).

Sequentially, the vendor-side computer 26 determines whether an difference between the measured profile and the reference profile is within a predetermined error range (for example, 5%) (step S15).

In step S15, when it is determined that the difference between the measured profile and the reference profile is within the predetermined error range (step S15; Yes), the operation flow is back to step S11, and the vendor-side computer 26 receives operating state data and continues to monitor the apparatus 10.

While, when it is determined that the difference between the measured profile and the reference profile is not within the predetermined error range (step S15; No), the vendor-side computer 26 judges that trouble has occurred in the apparatus 10. Then, the vendor-side computer 26 reports the trouble occurrence and the status to the plant 101 via the input/output device 25 of the plant-side computer 11, and reads contact information such as an e-mail address of a (person) in charge of maintenance at the manufacturer side (delivery destination) from the contact information database 34, and informs the person in charge of maintenance of trouble occurrence (step S16).

Moreover, the vendor-side computer 26 reports the trouble occurrence and the status to the worker at the vendor side via the input/output device 31 of the vendor-side computer 26, and reads contact information such as an e-mail address of a (person) in charge of maintenance at the vendor-side from the contact information database 34, and informs the person in charge of maintenance (field engineer) of trouble occurrence (step S16).

The workers at the plant 101 and the vendor perform a coping process based on the report from the vendor-side computer 26. Additionally, means for providing reports to the persons in charge of maintenance at the plant 101 and the vendor is not limited to the e-mail, and a cellular phone, a pocket beeper, and the like may be possible.

Further, when specifying the part, which is the cause of abnormality occurrence, from operating state data and judging that a part replacement is needed, the vendor-side computer 26 transmits order information to the relevant supplier with reference to contact information of the supplier that supplies the replacement parts stored in the contact information database 34.

For example, the vendor-side computer 26 judges that the profile of data relating to the gas flow is abnormal and that it is necessary to replace a valve from accumulation data, the vendor-side computer 26 instructs the field engineer to replace the valve and reads contact information of a valve supplier with reference to the contact information database 34, and transmits information of ordering the valve to the supplier.

The vendor-side computer 26 that has detected trouble occurrence sends maintenance information necessary for coping to the plant 101 (step S17). Here, if trouble is slight or a matter of software, the plant-side computer 11 downloads predetermined software from the vendor-side computer 26, so that restoration processing can be automatically performed. If not, the workers at the vendor side and the plant 101 that have received the report from the vendor-side computer 26 directly perform restoration processing.

As mentioned above, the vendor-side computer 26 monitors the apparatuses 10 provided in the plant 101 from a remote place according to the flow as illustrated in FIG. 9. The vendor-side computer 26 judges the operating state of the apparatus 10 from operating state data such as temperature obtained by the monitoring apparatus 10 that is provided in the apparatus 18. When judging that the apparatus 10 is an abnormal state, the vendor-side computer 26 reports abnormality occurrence to the workers at the plant 101 and the vendor side. At this time, when judging that a replacement part is necessary, the vendor-side computer 26 orders the replacement part in some cases. In this way, since the vendor-side computer 26 monitors the apparatus 10 from the remote place; it is possible to deal with trouble speedily and stop time of the apparatus 10 due to the apparatus 10 can be shortened. For this reason, the operation time of the apparatus 10 can be increased and the operation rate of the apparatus 10 can be improved.

Moreover, the vendor-side computer 26 not only performs remote-monitoring of the apparatus 10 as mentioned above but also collects maintenance data of the apparatus 10 and performs the operation for providing predetermined processing to the obtained maintenance data.

Though operating state data is sequentially transmitted to the vendor-side computer 26 from the apparatus 10, data of maintenance input by the worker is transmitted thereto when maintenance work such as part placement and the like is performed.

Here, the part replacement of the apparatus 10 is performed when the replacement time comes at the time of a periodic check (periodic overhaul) of the apparatus 10 or trouble is caused by the part and repair and replacement are needed. At the time of the part replacement, the worker stops the apparatus 10 and replaces the part to be replaced. After the replacement work ends, the worker inputs maintenance data such as the kind of the replaced part, date and time, using period, and the like from the input/output device 19 provided in the apparatus 10. Maintenance data is stored in the storage section 17. The central processing section 13 transmits maintenance data stored in the storage section 17 to the plant-side computer 11 via the plant internal wiring network 12. The plant-side computer 11 stores received maintenance data to the storage section 21 and transmits it the vendor-side computer 26 via the communication line 100.

The following will explain the operation of the vendor-side computer 26 at the maintenance data processing time with reference to the flowchart illustrated in FIG. 10.

First of all, the vendor-side computer 26 receives maintenance data from the plant 101 (step S21). The vendor-side computer 26 (central processing unit 27) stores received maintenance data to the history information database 32 (step S22).

Next, the vendor-side computer 26 reads the kind of the replaced part from maintenance data stored in the history information database 32, and reads the contact of the supplier of the relevant part with reference to the contact information database 34 as illustrated in FIG. 6 to transmit order information to the relevant supplier (step S23).

Back to FIG. 10, sequentially, the vendor-side computer 26 further performs predetermined analysis processing on maintenance data stored in the history information database 32. In other words, regarding the parts subjected to periodic replacement or repair and replacement, average using time is calculated for each kind of each part and a predetermined margin is provided to the obtained value to drive an optimal replacement period (step S24).

The derived optimal replacement period is updated and stored in the replacement period information database 35 (step S25). In this way, part replacement is performed to numerous apparatuses 10, and every time when new maintenance data is obtained, the replacement periods of the parts stored in the replacement period information database 35 is optimized.

The optimal replacement period of each part obtained by the aforementioned processing is sent to all plants 101, 110, and 120 periodically, for example, every one to two weeks. The plants 101, 110, and 120 can draw up a new plan to make it possible to obtain more efficient operation of the apparatus 10 and the plant 101 with reference to received replacement period information. Moreover, since the part replacement period is set be generally shorter than one that is actually forecasted in order to avoid trouble, reliability of the optimal replacement period of the part is improved and the part replacement period becomes longer. For this reason, the effective operation of the apparatus can be improved.

As mentioned above, the vendor-side computer 26 processes maintenance data including part replacement information according to the flow as illustrated in FIG. 10. The vendor-side computer 26 orders the replaced part and performs predetermined analysis processing from using time of the obtained part to derive the optimal replacement period of the part. Information obtained by analysis processing is sent to the user (plant 101 and the like) to be fed back to the operation of the apparatus 10.

Figure 11:
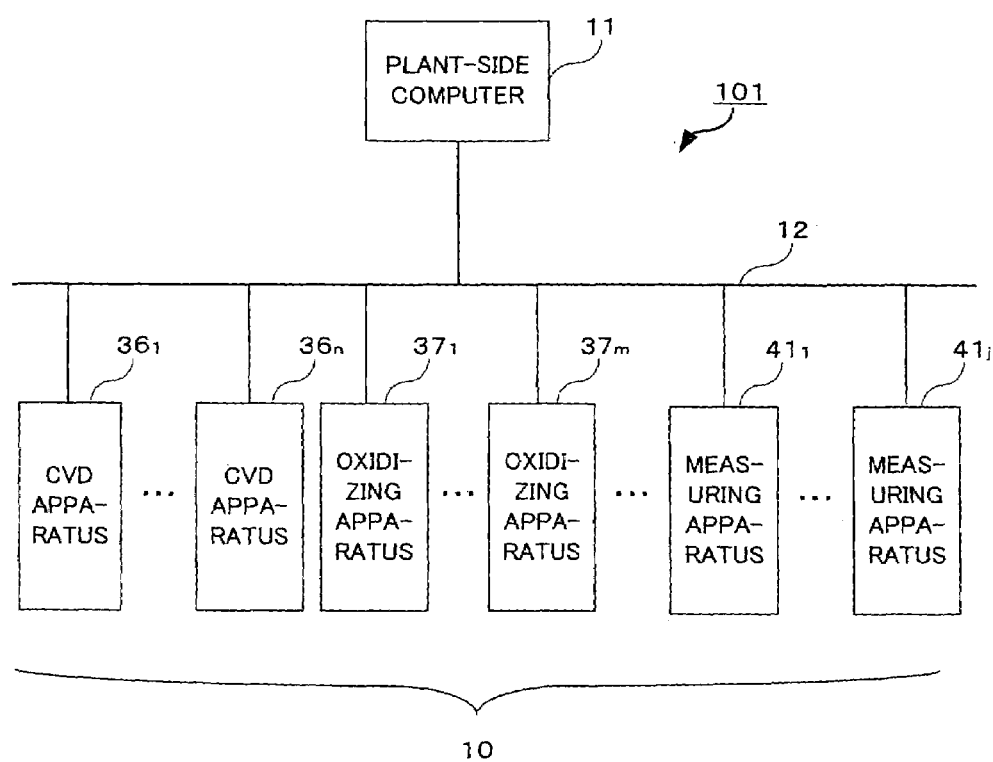
FIG. 11 is a structural view of a plant according to the embodiment of the present invention.

An explanation will be next given of the system using a case in which the apparatuses 10 such as CVD devices are set up in the plant 101 as an example. FIG. 11 illustrates the structure of the plant 101 according to the present embodiment. As illustrated in FIG. 11, the plant 101 includes the plant-side computer 11 and the plurality of apparatuses 10, and each apparatus 10 and the plant-side computer 11 are connected to each other via the internal wiring network 12. The apparatus 10 includes n CVD (Chemical Vapor Deposition) devices 36 ($36_1$ to $36_n$), other devices (m oxidizing devices 37 ($37_1$ to $37_m$)), and j measuring devices 41 ($41_1$ to $41_j$). n CVD (Chemical Vapor Deposition) devices 36 ($36_1$ to $36_n$) have substantially the same structure, and each contains a processing object such as a semiconductor wafer, and performs film forming processing on the processing object by CVD. One example of the apparatuses 10, the structural example of CVD device 36 will be explained with reference to FIG. 12.

Figure 12:
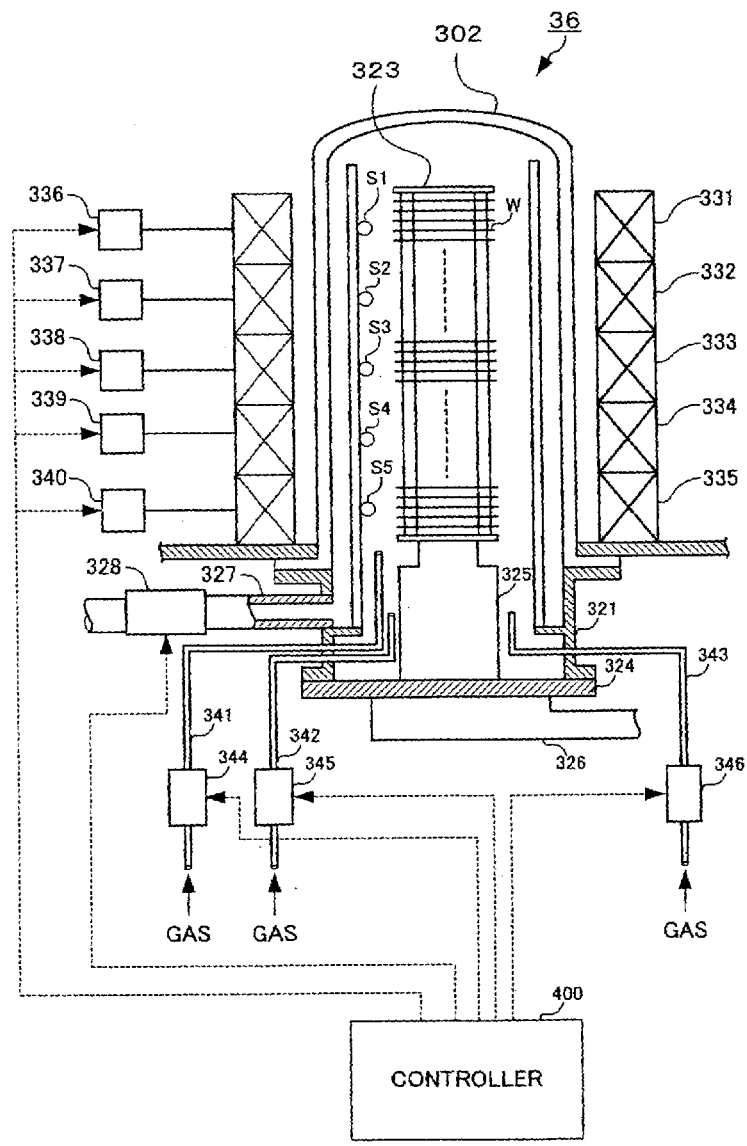
FIG. 12 is a structural view of a CVD apparatus according to the embodiment of the present invention.

As illustrated in FIG. 12, the CVD device 36 is a batch type, and includes a double-tube structure reaction tube 302 having an inner tube 302a and an outer tube 302b, and a metallic cylindrical manifold 321 is provided at the lower side of the reaction tube 302. In the reaction tube 302, numerous wafers W, for example, 150 processing objects are placed on a wafer board 323 horizontally in a shelf-like manner to have distances upper and lower. The wafer board 323 is held by a heat preserving cylinder 325 on a cover 324.

Five-stage structured heaters 331 to 335 are arranged around the reactor tube 302. Power is independently supplied to the heaters 331 to 335 to be independently controllable by power controllers 336 to 340. The reaction tube 302, manifold 321, and heaters 331 to 335 form a heating furnace. The interior of the reaction tube 302 is divided into five zones by the heaters 331 to 335.

Moreover, in the manifold 321, there are provided three gas supply pipes 341, 342 and 343 that supply gas to the inner tube 302a. Ingredient gas for film formation and carrier gas are supplied to the respective gas supply pipes 341, 342, and 343 through mass flow controllers (MFC) 344, 345, and 346, respectively. Moreover, an exhaust pipe 327 is connected to the manifold 321 to exhaust from a space between the inner tube 302a and the outer tube 302b. The exhaust pipe 327 is connected to a vacuum pump through a pressure control device 328. Further, in the reaction tube 302, there is provided a pressure sensor (not shown) that measures pressure in the reaction tube 302.

On an inner surface of the inner tube 302a, five temperature sensors (thermocouples) S1 to S5 as monitoring devices 18 are vertically arranged in line. The temperature sensors S1 to S5 are covered with a quartz pipe to prevent wafers W from being subjected to metal pollution, and they are provided for each zone.

Figure 13:
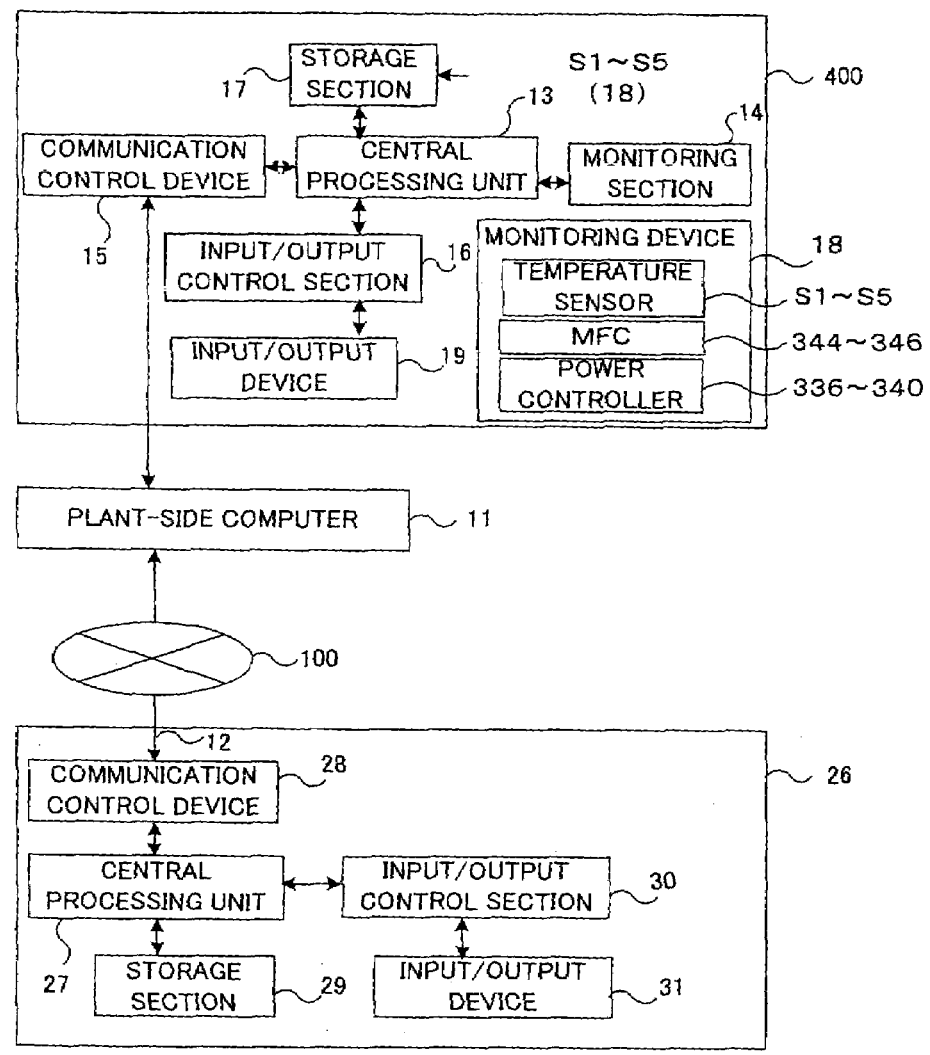
FIG. 13 is a structural view of a controller of FIG. 12.

The CVD device 36 includes a controller 400 that controls processing conditional parameters such as temperature of processing atmosphere in the reaction tube 302, gas flow, and pressure. FIG. 13 illustrates the structure of the controller 400. As illustrated in FIG. 13, the controller 400 includes the central processing unit 13, the monitoring section 14, the communication control device 15, the input/output control section 16, and the storage section 17. The monitoring section 14 includes the monitoring device 18 having temperature sensors S1 to S5, MFCs 344 to 346, and power controllers 336 to 340. Then, the communication control device 15 of the controller 400 is connected to the plant-side computer 11 via the plant internal wiring network 12, and the plant-side computer 11 is connected to the vendor-side computer 26 (communication control device 28) via the communication line 100.

Moreover, the storage section 29 of the vendor-side computer 26 includes the history information database 32, the profile information database 33, the contact information database 34, and the replacement period information database 35.

In the history information database 32, operating state data, maintenance data and measurement data of wafer W are stored. The operating state data and maintenance data are substantially the same as the data structure of the aforementioned system. However, in operating state data, the number of RAN times (RAN time) indicating that how often (or how many times) the operation is carried out after a predetermined part replacement or cleaning, is stored. This is because the physical property of the film to be formed on the wafer W differs depending on the number of RAN times. Measurement data is data such as a thickness of a film formed on the wafer W by the CVD device 36, uniformity of the film, and the like, and is stored to correspond to operating state data as illustrated in FIG. 14. Measurement data is measured by a measuring device 41 and transmitted to the vendor-side computer 26 periodically.

In the replacement period information database 35, optimal replacement period of each part that forms the apparatus is stored. FIG. 15 illustrates an example of the replacement period information database 35. As illustrated in FIG. 15, in the replacement period information database 35, a cleaning period for which the part is cleaned is stored in addition to the optimal replacement period for which the part is replaced.

In addition, the profile information database 33 and the contact information database 34 are the same as the data structure of the aforementioned system.

An explanation will be next given of the operation using the above-structured CVD device 36 with reference to FIG. 9.

During the monitoring operation, the vendor-side computer 26 receives real-time operating state data of the CVD apparatus 36 that the monitoring devices 18 such as temperature sensors S1 to S5 obtain (step S11). Then, the vendor-side computer 26 stores received operating state data in the history information database 32 (step S12).

The vendor-side computer 26 reads a predetermined parameter, for example, data based on temperature (change profile) in operating state data received from the history information database 32 (step S13). The vendor-side computer 26 compares the reference profile relating to the temperature stored in the profile information database 33 with the profile of read (measured) data (step S14). Here, in the present embodiment, in order that the processing result becomes uniform between the surfaces between the wafers W and in the surfaces, a reference profile (temperature recipe) adjusted in advance is prepared for each zone, and the measured profile and the reference profile are compared with each other for each zone.

Sequentially, the vendor-side computer 26 determines whether a temperature difference between the measured profile and the reference profile is within a predetermined error range (for example, 5%) (step S15).

When the temperature difference between the measured profile and the reference profile is within a predetermined error range (step S15; Yes), the operation flow is back to step S11, and the vendor-side computer 26 receives operating state data and continues to monitor the CVD device.

While, when it is determined that the temperature difference between the measured profile and the reference profile is larger than 5% (step S15; No), the vendor-side computer 26 judges that trouble has occurred in the CVD apparatus 36.

Then, the vendor-side computer 26 reports the trouble occurrence and the status to the worker at the vendor side and also reports the trouble occurrence to the person in charge of maintenance (field engineer) at the vendor side (step S16). Moreover, the vender-side computer 26 reports the trouble occurrence and the status to the plant side arranged CVD apparatus 36, and also reports the trouble occurrence to the person in charge of maintenance at the manufacturer side (step S16).

The vendor-side computer 26 specifies a cause of abnormality occurrence from data stored in the measured profile and operating status data. Then, when specifying the cause of abnormality occurrence from data stored in operating status data and judging that the part replacement is needed, the vendor-side computer 26 transmits order information to the supplier that supplies the replacement parts. For example, when judging that the profile relating to the temperature of the uppermost zone of the reaction tube 302 is abnormal, and the temperature of the uppermost zone of the reaction tube 302 is low even if an instruction is sent to the controller 400 to increase in the temperature of a heater 331, and a heater 331 at the uppermost portion must be replaced from accumulated data, the vendor-side computer 26 instructs the field engineer to replace the heater 331 and transmits information of ordering a heater to the heater supplier.

The vendor-side computer 26 sends maintenance information necessary for coping to the plant (step S17). Then, the workers at the plant and the vendor perform a coping process based on the report from the vendor-side computer 26.

Moreover, the vendor-side computer 26 may inform the workers at the plant and the vendor to change the temperature of the heaters 331 to 335 and the pressure in the reaction tube 302 from measurement data stored in the history information database 32 and data accumulated in the history information database 32. Thereby, the measuring result of the measuring device 41 can be fed back to the film forming condition of the CVD device 36. In this case, a predetermined error range may be possible without limited to the case in which the measuring result is out of the predetermined error range, for example, as in a case in which the thickness of the formed film is within specs but it is a little larger.

An explanation will be next given of the operation of the vendor-side computer 26 at the maintenance data processing time with reference to FIG. 10.

First of all, the vendor-side computer 26 receives maintenance data stored in the storage section 17 from the central processing unit 15 via the plant-side computer 11 (step S21). The vendor-side computer 26 stores received maintenance data to the history information database 32 (step S22).

Next, the vendor-side computer 26 reads the kind of the replaced part from maintenance data stored in the history information database 32, and transmits order information to the supplier for the relevant part (step S23).

Sequentially, the vendor-side computer 26 provides predetermined analysis processing to maintenance data to derive an optimal replacement period (step S24), and updates and stores it to the replacement period information database 35 (step S25). The optimal replacement period of the obtained part obtained by the aforementioned processing is sent to the plant 101 periodically, for example, every one to two weeks. The plant 101 can draw up a new plan to make it possible to obtain more efficient operation of the CVD apparatus 36 with reference to received replacement period information.

Moreover, the vendor-side computer 26 may inform the workers at the plant and the vendor that the part replacement is needed according to the number of apparatus using times and using hours. For example, the vendor-side computer 26 determine the number of times the CVD apparatus 36 has performed the film processing of wafer W from operating state data stored in the history information database 32. Then, when film forming processing for wafer W is performed a predetermined times, for example, xx times (RUN xx times), the vendor-side computer 26 informs the workers at the plant and the vendor that the wafer board 323 needs to be cleaned with reference to the replacement period information database 35 shown in FIG. 15. Moreover, the vendor-side computer 26 informs the workers at the plant and the vendor that the wafer board 323 needs to be replaced when it is determined that film forming processing for wafer W is performed times (RUN times).

As explained above, according to the system of the present invention, the vendor-side computer 26 performs remote-monitoring of the apparatus 10 based on operating state data obtained by the monitoring device 18 of the apparatus 10. Moreover, maintenance data relating to the part replacement is sent to the vendor-side computer 26 from the apparatus 10. The vendor-side computer 26 calculates the optimal replacement period of the part from maintenance data, converts it to database form and stores it. Information converted to database form is sent to the plant 101 periodically, and the plant can feed back information and use it as an efficient operational condition of the apparatus 10. For this reason, the user side combines received replacement period information with each operation plan to make the preventive maintenance efficient, so that the apparatus 10 can be operated at a high operation rate. Accordingly, the productivity of the product using the apparatus 10 can be improved.

The present invention is not limited to the aforementioned embodiment, and various modifications and applications may be possible. The following will explain the modification of the aforementioned embodiment that is applicable to the present invention.

In the aforementioned embodiment, maintenance data relating to the part replacement was input from the input/output device 19 provided in the apparatus 10. However, it is not limited to this, and maintenance data is input from the plant-side computer 11 and this may be transmitted to the vendor-side computer 26. Moreover, though operating state data transmitted from the apparatus 10 and maintenance data are transmitted to the vendor-side computer 26 via the plant internal wiring network 12, the communication control device 15 provided in the apparatus 15 is directly connected to the communication line such as the Internet, so that data may be directly transmitted to the vendor-side computer 26.

In the aforementioned embodiment, the monitoring device 18 provided in the apparatus 10 was the temperature sensor, the pressure sensor, the flow sensor and the like. Moreover, operating state data transmitted from the apparatus 10 was physical data relating to the temperature, the pressure, the gas flow, and the like. However, operating state data may be physical data showing the operating state of the apparatus 10 and may include the number of processing objects such as semiconductor wafers subjected to processing by the apparatus 10. In this case, for example, the vendor-side computer 26 may be caused to monitor the change in the throughput per unit time. Further, in this case, it is possible to instruct the plant side to replace a predetermined part every time when the predetermined number of wafers is processed.

Furthermore, yield data may be included in operating state data. In this case, the worker at the plant 101 may input yield data of the apparatus 10 from the input/output device 19 of the apparatus 10 to send the yield data to the vendor-side computer 26. In this way, it is possible to combine various physical data showing the operating state of the apparatus 10 to monitor the operating state of the apparatus 10 from various side surfaces.

In the aforementioned embodiment, the vendor-side computer 26 compares operating state data received from the apparatus 10 with the reference profile relating to a predetermined parameter to judge the operating state of the apparatus 10 according to the operation plan (process chart) of the apparatus 10. At this time, when the difference with the reference profile is out of a predetermined error range, it is judged that the apparatus 10 is in an abnormal state. However, the judging method is not limited to this, and the other known judging method or a combination with this may be used.

Furthermore, the vendor-side computer 26 may be structured to judge the status of the apparatus 10 from a CCD image, an SEM image, and the like. In this case, the monitoring device 18 includes an image pickup device such as CCD, SEM, and the like. For example, when the operating state of the apparatus 10 is judged using CCD image data, the images of the chamber structural parts are periodically formed, so that the deterioration state of the respective parts may be judged form the formed images. Moreover, in a case where SEM image data is used, for example, SEM image data of the processed wafer surface is obtained, the obtained image is compared with a reference image (image subjected to desirable processing) to judge the absence or presence of particles, pattern defect, so that the operating state of the apparatus 10 may be judged. Further, such image data and the aforementioned physical data are combined, so that the operating state of the apparatus 10 may be monitored in a many-sided manner.

In the aforementioned embodiment, the vendor-side computer 26 performs analysis processing on maintenance information obtained from the apparatus 10 to calculate the optimal replacement period of the part, and feeds back it to the user (plant) side. However, without limiting to this, a structure that derives any information by analysis processing of maintenance information may be possible if feed back to the operation of the apparatus 10 is possible.

For example, information fed back to the user side may be used as a periodic check time of the apparatus 10. Generally, in the apparatus 10, since cleaning of the apparatus, an addition of grease to the mechanical parts, and the like are carried out in addition to the part replacement, the check work is performed periodically. At the time when the apparatus 10 is delivered to the user, a value relating to the periodical check time, which is obtained when the vendor side conducts a test, is given to the user side. For this reason, similar to the part replacement period, a given periodical check time does not correspond with the actual using condition. Accordingly, actual using data is collected and processed described below, thereby making it possible to perform optimization.

In this case, for example, maintenance information (operation information, maintenance information) transmitted to the vendor-side computer 26 from the apparatus 10 may be variously selected. More specifically, maintenance information transmitted from the apparatus 10 is used as the number of processing wafers of the apparatus 10 to obtain an optimal periodical check time from the correlation with the processing number or a particle counter is used as the monitoring device 18 to obtain an optimal periodical check time from the correlation with an increase/decrease in the particle quantity in the chamber obtained from the particle counter, whereby this may be fed back to the user side. Even if the periodical check time is optimized and fed back to the user side in this way, it is possible to make the maintenance management including preventative maintenance efficient.

In the aforementioned embodiment, the vendor-side computer 26 derives the optimal replacement of the part from collected maintenance data to convert it to database form, and transmit it to the user side periodically. The optimal replacement period of the part converted to database form can be structured to be openable or searchable on the Internet by providing a unique browser to the vendor-side computer 26 and the plant-side computer 11.

In the aforementioned embodiment, the apparatuses connected to the vendor-side computer 26 via the plant-side computer 11 were the same types. However, apparatuses of a plurality of types are provided in the same plant, the vendor-side computer 26 may grasp maintenance management information of each apparatus by the same structure as the aforementioned embodiment. At this time, the vendor-side computer 26 constructs the database for each type of the apparatus to manage maintenance management information.

In the aforementioned embodiment, the plant 101 was the semiconductor manufacturing plant, and the apparatuses used in the plant 101 were manufacturing devices such as semiconductor devices, liquid crystal display devices and the like. However, without limiting to this, the system of the present invention can be applied to the manufacturing plant for other electronic devices such as CCD, solar battery, and the like, and other general industrial products.

According to the present invention, it is possible to improve productivity. Moreover, efficient maintenance management can be performed.

INDUSTRIAL APPLICABILITY

The present invention can be used to the manufacturing device for industrial products such as electronic device products.

The invention claimed is:

1. A method for monitoring an apparatus from a remote location, the method comprising the steps of:
    receiving history information, including a processing conditional parameter of a predetermined process that the apparatus performs to provide predetermined processing to a processing object and measurement data relating to products manufactured by the apparatus, from the apparatus indicating an operating state of the apparatus from the apparatus via a communication line;
    monitoring the apparatus based on the history information received by said receiving step; and
    storing information indicating reference information and an error range for the processing conditional parameter in a storage section,
    wherein said monitoring step transmits a notification that trouble has occurred in the apparatus to at least one of the apparatus and a person in charge of the apparatus when a difference between the reference information and the history information received during said receiving step is not included in the error range stored during said storing step,
    said monitoring step is performed from a remote location by a vendor that provided the apparatus, and
    said monitoring step includes monitoring the apparatus based on the measurement data received in said receiving step.

2. The method according to claim 1, wherein in said monitoring step, when trouble in the apparatus is detected based on the history information, a trouble part of the apparatus is specified, and at least one of order processing and order preparation processing for a replacement part of the trouble part is performed.

3. The method according to claim 1, wherein in said monitoring step, an optimal periodic check time of the apparatus is derived based on the history information of the apparatus, and the derived optimal periodic check time is fed back to the apparatus.

4. The method according to claim 1, wherein in said receiving step, maintenance data relating to a replaced part of the apparatus is further received from the apparatus, and in said monitoring step, the apparatus is monitored based on the maintenance data received in said receiving step.

5. The method according to claim 4, wherein the maintenance data is data relating to replacement date and time, kind, and usage time of the replaced part that is obtained at the time of replacing the replaced part in the apparatus, and in said monitoring step, an optimal replacement period of the replaced part is derived from the maintenance data and fed back to the apparatus.

6. The method according to claim 4, wherein in said monitoring step, at least one of order processing and order preparation processing for a replacement part is performed based on the maintenance data.

7. The method according to claim 1, wherein the processing conditional parameter includes temperature of a chamber of the apparatus, pressure, gas flow, or combinations of these.

8. The method according to claim 1, wherein the apparatus is a manufacturing apparatus for at least one of semiconductor devices and liquid crystal display devices.

9. The method according to claim 1, wherein said storing step stores maintenance information and a difference between the reference information and the operating state is included in said error range, and said monitoring step includes said maintenance information in the notification that trouble has occurred in the apparatus.

* * * * *